United States Patent

[11] 3,614,318

[72] Inventor Ulrich Klose
Lidingo, Sweden

[21] Appl. No. 847,858

[22] Filed Aug. 6, 1969

[45] Patented Oct. 19, 1971

[73] Assignee International Business Machines Corporation
Armonk, N.Y.

[32] Priority Sept. 3, 1968

[33] Sweden

[31] 11812/68

[54] DATA TRANSMISSION SYSTEM
7 Claims, 5 Drawing Figs.

[52] U.S. Cl. .......... 178/68, 307/223, 340/168

[51] Int. Cl. .......... H04l 27/02

[50] Field of Search .......... 178/66, 68; 340/147 R, 167 R, 167 P, 168 R, 168 B, 168 CC, 168 S; 328/37; 307/221, 222, 223

[56] References Cited

UNITED STATES PATENTS

| | | | |
|---|---|---|---|
| 3,168,268 | 2/1965 | Bossart et al. | 340/167 X |
| 3,257,642 | 6/1966 | Lazerges | 340/167 X |
| 3,493,933 | 2/1970 | Brooks | 328/37 X |

*Primary Examiner*—Benedict V. Safourek
*Attorneys*—Hanifin and Jancin and John B. Frisone

ABSTRACT: A transmitter and receiver for use in a two-wire transmission network in which a central station controls data flow in both directions by controlling the polarity of the line and the transmitter and receiver each include a plurality of polarity sensitive switching stages in which adjacent stages have opposite polarity orientation and each of the stages is turned "on" by one polarity orientation and "off" by the opposite polarity orientation on the transmission line.

DATA TRANSMISSION SYSTEM

The present invention relates to a data transmission system and in particular to such a system whereby data is transmitted from a substation to a central station or vice versa.

Transmission of data from a central station by means of a transmission channel to a substation or vice versa usually requires good control and synchronizing devices in both the central station and the substation. Especially if the data transmission has to be performed at high speed, for instance with electronic speed, then these control and synchronizing devices will be very complex and expensive. It is possible to a certain degree to simplify the construction of the substation by letting the central station take over the major part of the control function, this however usually leads to an increase in the number of wires in the transmission channel. If the substation is located far from the central station the number of wires in the transmission channel is very important. Moreover if the central station has to serve several substations having units with different speed, this calls for still more sophisticated control devices in the data transmission system.

It is therefore an object of the present invention to provide a data transmission system between a central station and a number of substations which requires a minimum of control means in the substations and whereby the number of wires in the transmission channel between the central station and the substations is small.

It is another object of the present invention to provide a data transmission system for data transmission from a transmitter unit to a receiver unit by means of a two-wire system.

It is a further object of the invention to provide a two-wire data transmission system between a transmitter and a receiver by means of polarity change.

It is another object of the invention to provide a stepping scanner which will be controlled by means of a two-wire connection from a central unit whereby scanned data will be transmitted to the central unit by means of the same two-wire connection.

A further object of the present invention is to provide a shift register which will be controlled by means of a two-wire connection from a central unit and whereby a data pattern can be read into the shift register from the same two-wire connection from the central unit.

Still another object for this invention is to provide a stepping switching chain which will be controlled at a varying speed by means of a two-wire connection from the central unit.

It is a further object of the present invention to provide a data transmission system for transmitting data serially from the central unit to a stepping switching chain and to read out from this chain in a parallel form.

Still another object of the present invention is to provide a stepping switching chain using silicon controlled transistors.

The foregoing and other objects, features and advantages of the invention will be apparent from the following more particular description of a preferred embodiment of the invention, as illustrated in the accompanying drawings.

Figure 1:
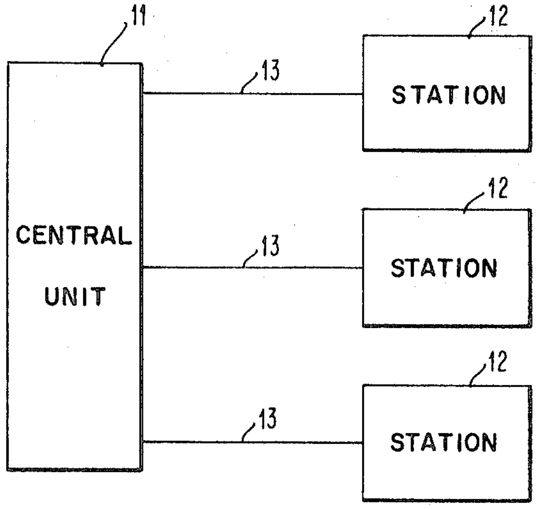
FIG. 1 illustrates a schematic wire of a central unit and a number of substations.

A data transmission system in a simple form is shown in FIG. 1. A central unit 11 serves a number of substations 12 via transmission channels 13. This data transmission can consist of read-in operations whereby data from the stations 12 are transferred by a transmission channel to the central unit, or it can consist of readout whereby data from the central unit is transferred by transmission channels to the stations 12.

In the following description, a system will be explained having only one central unit, one substation and one transmission channel. This simplification is employed to make the description easier to understand, it will by no means restrict the present invention only to transmission between two units.

Figure 2A:
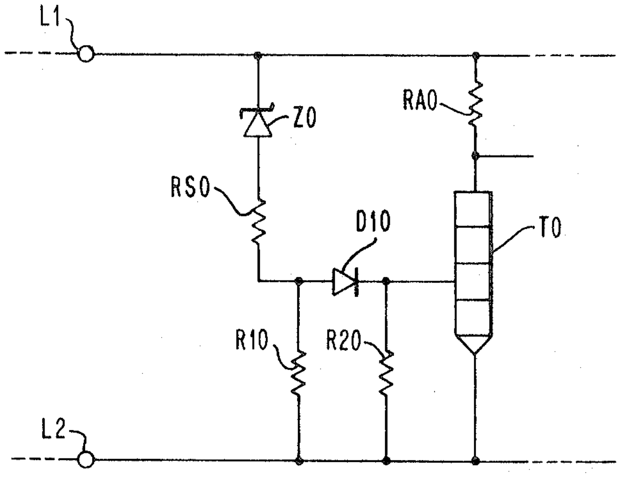
FIG. 2*a* is a modification of the circuit illustrated in FIG. 2.
Figure 2:
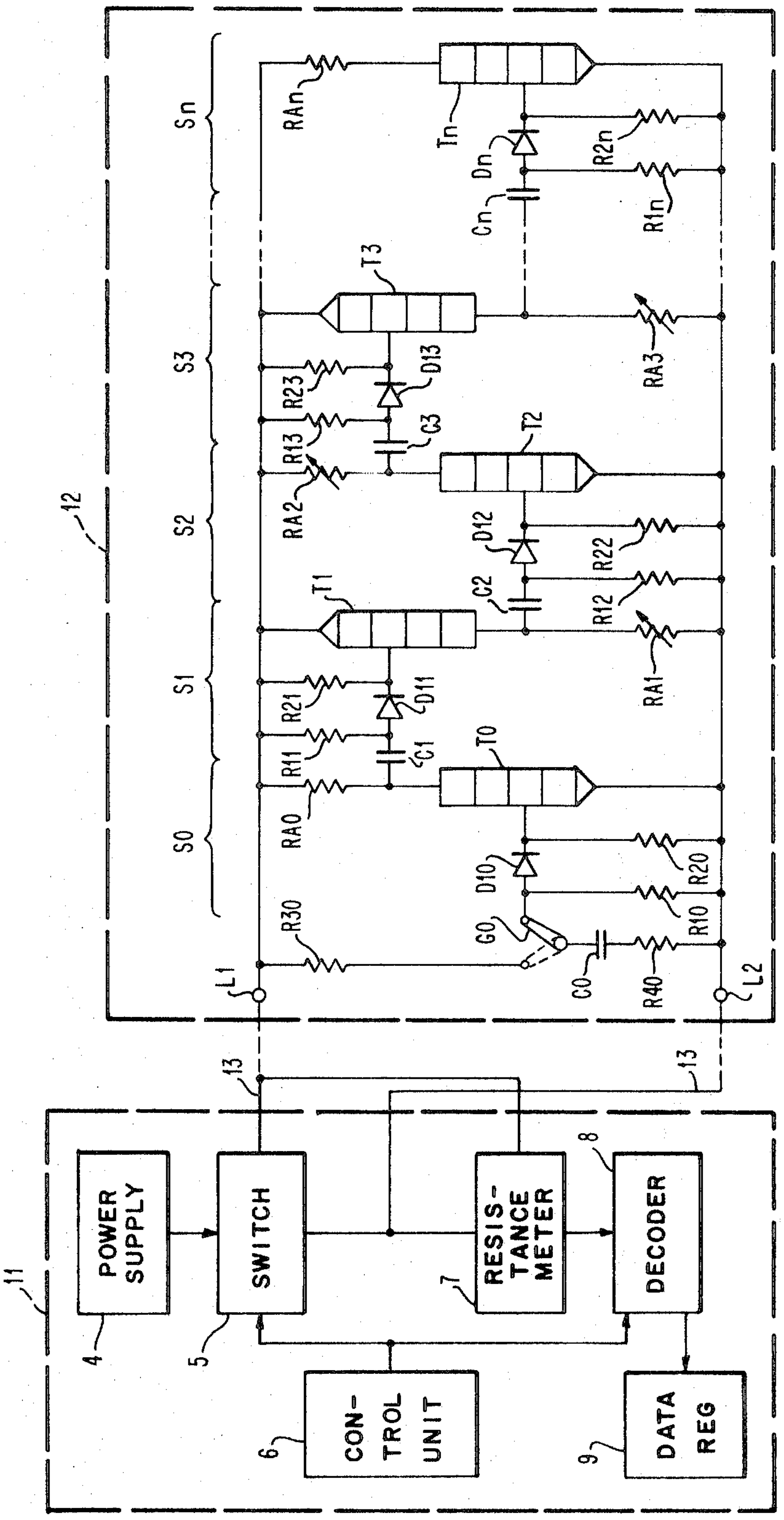
FIG. 2 illustrates a data acquisition system according to the present invention.

In FIG. 2, readout of data from substation 12 by transmission channel 13 is controlled by a central unit 11. In accordance with the present invention the substation 12 consists of a stepping scanner having as a main part in each stage a silicon controlled switch. The stepping scanner is advanced by a polarity change at input points L1 and L2. Readout is accomplished through a resistance metering of these same points L1 and L2 whereby the main part of the sensed resistance originates from the anode resistor of a silicon controlled switch in an activated stage. The voltage and current supply for the substation 12 is also provided from the central unit 11 by means of the transmission channel 13.

In the central unit 11, a power supply 4 is connected to a switch 5 which is further connected to the two output wires for the transmission channel 13. A data register 9 is connected to a decoder 8 which is connected to a resistance meter 7 and further through said output wires to the channel 13. A control unit 6 controls the switching rate of the switch 5 and the sampling rate of decoder 8.

The transmission channel 13 consists of two wires connected to the input terminals L1 and L2 in the stepping scanner in the substation 12.

The stepping scanner 12 has two terminals L1 and L2 which function both as input terminals, and further a number of silicon controlled stages S0–Sn. In the first stage S0, the cathode of silicon controlled switch T0 is connected to the point L2. Its anode is connected to a resistor RA0 which is also connected to the other point L1. The controlled gate of said silicon controlled switch T0 is connected by a resistor R20 to the point L2. Parallel to R20, there is provided a series connection of a diode D10 and a resistor R10. Parallel to the resistor R10, there is a series connection of a normally closed pushbutton switch G0, a capacitor C0 and a resistor R40. The normally open contact of the pushbutton switch G0 is connected to one terminal of a resistor R30, the other terminal of which is connected to the terminal L1. In the other stage S1 the cathode of the silicon controlled switch T1 is connected to the terminal L1 and the anode of the switch is connected through a resistor RA1 to the terminal L2. The control gate of a switch T1 is connected through a resistor R21 to the terminal L1 and further through a series connection of a diode D11 and a capacitor C1 to the connecting point of the resistor RA0 and the anode of the switch TO. A resistor R11 is connected between the terminal L1 and the connecting point of the diode D11 and the capacitor C1.

The next stage S2 is connected in the same way as the stage S1 except for the connection of the cathode of the switch T2 to the terminal L2 in the same manner as in the stage S0. The stage S3 is connected symmetrically in the same way as stage S1 and stage S4 in the same way as stage S2 etc.

The function of the circuit of FIG. 2 is as follows. The resistors RA in the substation 12 are settable on different resistor values, for example at a low value and at a high-resistance value, these settings being equal to the binary value zero and the binary value one respectively. Data to be read from the substation 12 and to be transferred to the central unit 11 is set by means of the resistors RA in the substations scanner stages S1–Sn. The power supply 4 in the central unit 11 provides through the switch 5 a positive voltage to the input terminal L1 and a negative voltage to the input terminal L2. A data transmission is initiated through an activating of the pushbutton G0 whereby a circuit is closed through the input terminal L1, the resistor R30, the normally open contact of the pushbutton G0, the capacitor C0, the resistor R40 and the input terminal L2. The condenser C0 is then charged. When the pushbutton G0 is released, the switch T0 will receive a gating voltage from the capacitor C0 through the diode D10 to the control gate of the switch. This turns the switch C1 on, whereby current will flow through the terminal L1 through the resistor RA0, the switch T0 to the terminal L2. Simultaneously the capacitor C1 will be charged to prepare the activation of the next stage S1.

Activation of the first stage S1 is made by the switch 5 in the central unit 11 which switches the voltage polarity of the terminals L1 and L2 so that L2 will get a positive voltage and L1 a negative voltage. Through the polarity change in the anode-cathode circuit for the silicon controlled switch T1, the switch T0 will now be cut off. The capacitor C1 will provide through the diode D11, a bias to the switch T1 the switch T0 will now be cut off. The capacitor C1 will provide through the diode D11, a bias to the switch T1 in the stage S1 whereby this switch will conduct. Current will then flow through the terminal L2 over the anode resistor RA1, the switch T1 to the terminal L1. The resistance between the terminals L1 and L2 will now mainly consist of the anode resistor RA1. Since the switches in the other stages now are cut off, the resistance of these stages are very large. The resistance meter 7 in the central unit will now register the value of RA1 over the terminals L1 and L2. If RA1 has been set to its low value, the measured resistance value will be sensed in the decoder 8 in the central unit as binary zero and will be transferred to the data register 9. If the resistance RA1, however, is set to the higher resistance value a binary one will be transferred into the data register 9.

The switch 5 will now again reverse the polarity on the terminals L1 and L2 whereby L1 will have a positive potential and L2 a negative potential. In the same manner as previously, this will result in a cutoff function for the activated switch, that means the switch T1 in the stage S1, and in the conduction state for the switch T2 in the following stage S2. This reset of the stage S1 and the pickup of stage S2 will result in a measurement of the resistance value RA2 by the resistance meter 7 in the central unit 11, this resistance value will be transferred by the decoder 8 to the data register 9. The voltage polarity of the terminals L1 and L2 will then again be reversed whereby the scanner will step to the stage S3 etc. This will provide a method through polarity change from the central unit 11 to step the scanner 12 and to sense the resistance value at each stage. This will result in a data transfer of data set in the substation to the central unit 11.

The diodes D10–D13 are used to protect the gate-cathode circuit against high back voltage when the switch is reverse biased.

In another embodiment of the present invention illustrated in FIG. 2*a*, the pushbutton switch G0 has been replaced by a series connection of a Zener diode Z0 and a resistor R50 in the stage S0. This Zener diode Z0 will not pass a normal voltage from the terminal L1. It will, however, let through an initial voltage which is higher than the normal stepping voltage. The power supply 4 in the central unit 11 will therefore deliver a start signal with a high voltage to the terminal L1 to initiate the stepping. This start signal with the higher voltage value will be fed through the switch 5, the terminal L1, the zener diode Z0, the resistor R50 and the diode D10 to the gate of the switch T0 whereby the transistor will turn on. The circuit will then function in the same way as described above.

The scanner in the substation 12 will be reset through cutting off the voltage on the terminals L1 and L2. The scanner will then be set to its initial state.

The data transmission system as shown in FIG. 2 provides many advantages and possibilities of modifications. It is possible to control the scanner from the central unit 11 in such a mode that the scanner will be advanced with high speed to one desired stage, it will then wait at this stage for a longer time and will then be stepped further. The scanning can so be performed with arbitrary and varying speed. Further, it is, of course, possible to provide more than two settable values for the resistors RA. It is even possible to use continuously changing resistance values whereby analog signal transmission can be provided. The resistors RA can be set manually or automatically.

The use of silicon controlled switches has only been chosen as an example, it is obvious that other similar switching elements can be used.

When the substation 12 will send a call to the central unit 11 for initiating a data transmission, the pushbutton switch G0 is used. As previously described, this will result in an activation of the stage S0 whereby the central unit will sense the resistance RA0 over the terminals L1 and L2 instead of the previously sensed big resistance value when no stage was activated. This changed resistance value can be used as a calling signal for the central unit 11 to initiate a data scanning.

Figure 3:
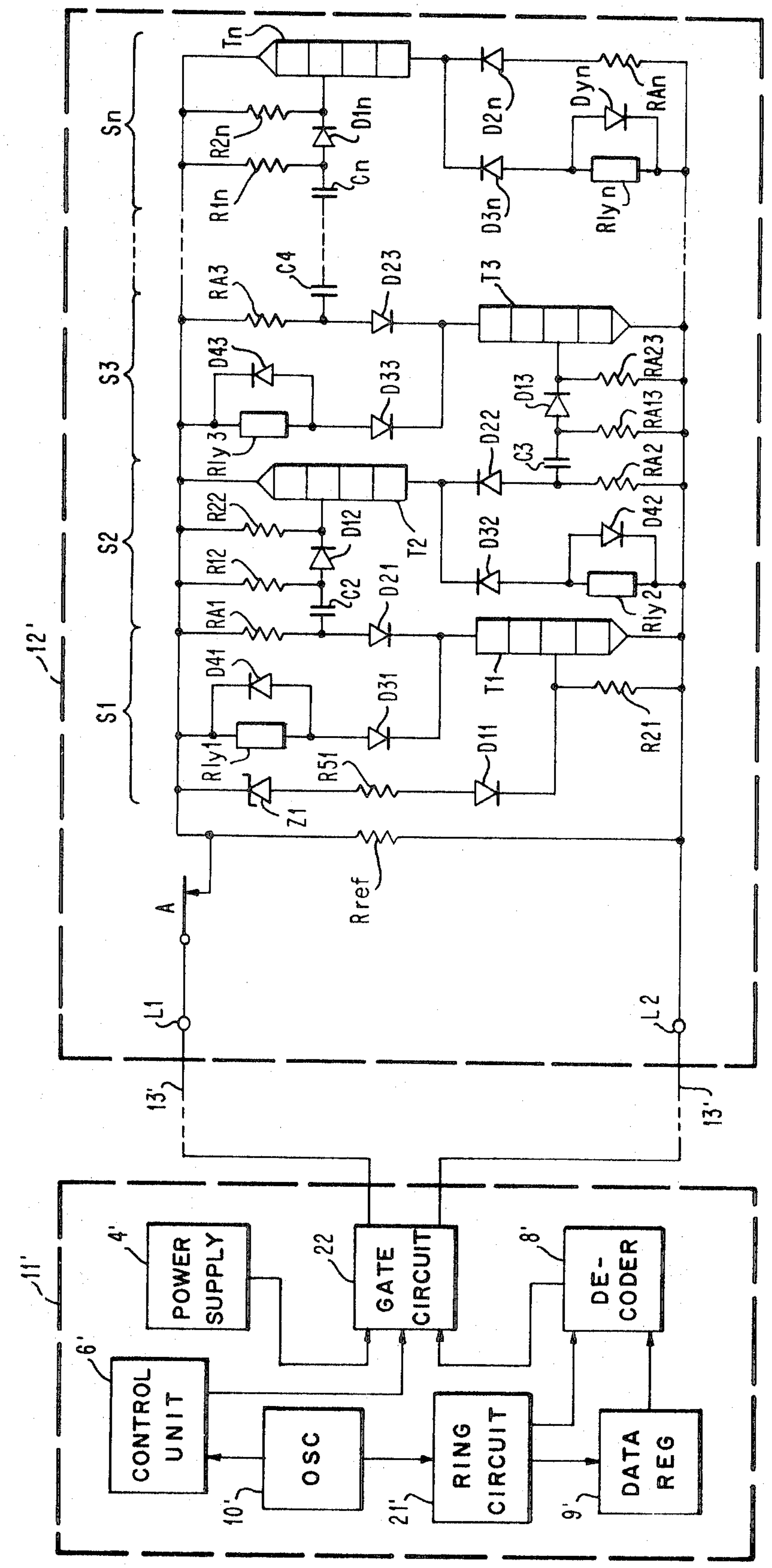
FIG. 3 illustrates a data readout system in accordance with the present invention.

In FIG. 3, there is shown a data transmission system having data transferred from a central unit 11′ by a transmission channel 13′ to a substation 12′. The circuit in the device 12′ differs in this case from the corresponding circuit in FIG. 2 mainly in that the bistable stages in FIG. 3 function mainly as a shift register.

In the central unit 11′, there is a power supply 4′ connected to gating circuits 22 having a two-wire output to the transmission channel 13′. An oscillator 10 is connected to a ring-counter 21 having an output connected to the input of a decoder 8′, the other input for this decoder is connected to the output from a data register 9′. The output from the decoder is connected to the input for the gating circuits 22. The transmission channel 13′ consists of a two-wire channel connected to the input terminals L1 and L2 for the substation 12′. A control circuit 6′ is connected to the oscillator 10 and to the gating circuits 22.

The input terminal L1 in the device 12′ is connected through a contact A to a resistor Rref. which further is connected to the second input terminal L2. The stage S1 in the shift register circuit 12′ contains a silicon controlled switch T1 having a cathode connected to L2 and an anode connected to a diode D21, a resistor RA1 and the contact A to the terminal L1. Parallel to D21 and RA1 a diode D31 is connected in series with a relay Rlyl connected in parallel with another diode D41. The gate terminal of the switch T1 is connected through a resistor R21 to the terminal L2 and further through a diode D11, a resistor R51 and a Zener diode Z1 and contact A to the terminal L1. The output from the stage S1 is connected through a capacitor C2 and a diode D12 to the gate electrode of the switch T2 in the second stage S2. The cathode of the switch T2 is connected to the terminal L1 and the anode is connected through a diode D22 and a resistor RA2 to the terminal L2. The anode of switch T2 is also connected through another diode D32 and a relay Rly2 connected in parallel with a diode D42 to terminal L2. The gate of the switch T2 is also connected through a resistor R22 to the terminal L1. Further a resistor R12 is connected between the terminal L1 and the common point between the capacitor C2 and the diode D12. The other stages in the shift register are connected in the same way as stages S1 and S2 so that the switch has its cathode connected to the terminal L2 in every second stage, in the other stages the switch cathodes are connected to L1.

In the circuit of FIG. 3, the voltage source 4′ in central unit 11 provides two voltage levels to the gating circuit 22. The oscillator 10 will feed step pulses to the ring counter 21 having an output connected to the decoder 8′. The decoder 8′ is controlled by data from the data register 9′ whereby the correct potentials are selected in the gate circuit 22. Consequently a high potential will be selected in the initial or start state providing a positive potential to the terminal L1 and a negative potential to L2. The Zener diode Z1 will conduct due to this high potential and the switch T1 will turn on. The gating circuit 22 will then select the lower working potential from the voltage supply 4 and connect this potential to the terminals L1 and L2, L2 being positive and L1 being negative. The switch T1 will be cut off and the switch T2 will be conducting due to the capacitor C2 which was charged during the previous potential state. During the next cycle, the gating circuits 22 can either choose a higher voltage or a lower voltage from the voltage supply 4′. This selection is controlled by control signals from the decoder 8′. If a digit one is to be fed into the shift register, a higher voltage level will be chosen, L1 will then receive a high positive potential and L2 a negative potential. This means that T1 will turn on similar to the first working cycle, T2 will be cut off and T3 will turn on due to the charge on capacitor C3 acquired in the previous cycle. In the shift register stages S1 and S3 are activated and all the other stages are cut off. This means that stages S1 and S3 have stored a digit one and the other stages contain zeros. During the following working cycle, the voltage polarity is changed on L1 and L2 whereby stages S2 and S4 are turned on and stages S1 and S3 are reset. During the next cycle, a high or a low potential can be applied. If low voltage is applied, the Zener diode Z1 will not conduct and the switch T1 will remain in a cut off state. The switches T2 and T4 will be cut off and T3 and T5 will conduct. In this manner, further information can be shifted into the shift register and the pattern is simultaneously shifted to the right.

The diodes D21–D31, D22–D32, D23–D33 ... are used to supply sufficient hold current to the switches during normal working conditions.

The input of a data pattern in accordance with the data stored in the data register 9′ in the central unit 11′ can be made with such a speed or with so short pulses that the relays Rly in the shift register will not be activated. These relays need a certain minimal signal duration in order to be picked up. Such a pulse with sufficient duration to pick up the relays which are connected in series with the conducting switches can be applied to the terminals L1 and L2 when the pattern has been shifted into the shift register. The working contacts of these relays are used for parallel readout of data or for parallel indication of the data pattern which has been stepped into the shift register.

The shift register will be reset by cutting off the incoming voltage, for instance by means of the contact A.

It is obvious that other electrical components can be used instead of relays Rly, for instance electronic components such as transistors. This invention is further not restricted to the use of a Zener diode circuit only in the first stage (SO) such a circuit can also be connected to some other stages in order to provide a group of parallel shift registers.

Due to the principle of the polarity change, the capacity of the shift register is reduced to $n$:2 positions whereby $n$ means the number of stages. It is then possible to store information in odd or even stages. The odd stages can, for instance, be used for storing information of a first type, for instance data words and the even stages for another type of information, for instance control words or vice versa.

Figure 4:
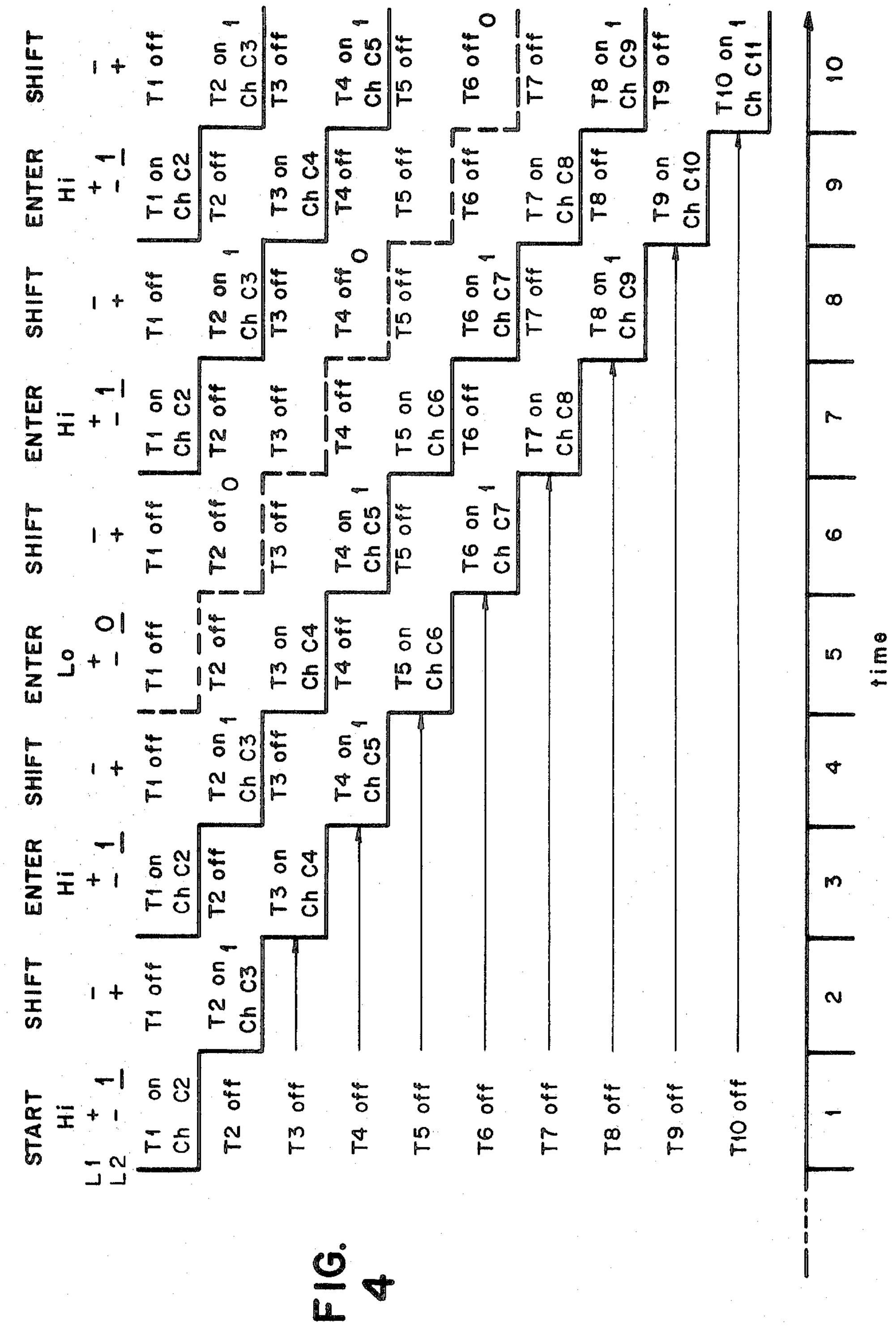
FIG. 4 is a table illustrating the operation of the circuit of FIG. 3.

The table illustrated in FIG. 4 shows the sequence of the various stages T1–T10 for entering the binary code 11011 into the receiver 12′. The timing of the polarity changes indicated is under control of unit 6′. The actual voltages are provided by supply 4′. Gate circuit 22 does the actual switching under control of decoder 8′ which is responsive to the ring circuit 21 which indicates the starting condition and register 9′ which indicates the bit position contents, i.e. 11011 in the example. All the above circuits are under control of oscillator 10 and directly timed by the oscillator.

Ring circuit 21 will indicate the beginning or start of transmission, this may be done by direction connection of one position, to decoder 8′ which causes gate circuit 22 to supply a high voltage to terminals L1 and L2 with the polarity indicated in the table. This causes T1 to turn on and charge capacitor C2. We are assuming a reset condition in unit 12′, therefore, T2–T10 are off. The next sequence is a shift sequence. In this sequence, a low voltage is supplied with the polarity indicated. This sequence is initiated under control of unit 6′ which is timed by oscillator 10. At this time, T1 turns off and T2 turns on due to the bias voltage from the previously charged capacitor C2. When T2 turns on, capacitor C3 charges.

The next cycle is an enter data cycle and is controlled by the contents of data register 9′. It should be noted that data transfer is initiated by inserting a 1 in the first instance. Thus, when tee last stage in chain switches to one transmission is indicated to be complete. This technique was selected to provide this indication. It is not necessary since leading 0's need not be transmitted and some other indication of transfer complete could be used. In the first enter cycle, a 1 is to be entered and decoder 8′ causes gate 22 to select a high voltage with the polarity indicated for the first enter position in the table. When the polarity switches T1 turns on, T2 turns off and T3 turns on. Capacitors C2 and C4 are charged during this cycle. Each entry is followed by a shift which is the opposite polarity at low voltage.

The second enter cycle, in the example is the entry of a 0, this condition is detected by decoder 8′ and causes gate 22 to supply a low voltage with the polarity indicated (Note: All enter and the start polarity are the same with a high voltage for entering a 1 and a low voltage for entering a zero; the shift polarity is opposite to the enter and start and is always low voltage). As soon as the polarity switches T1 and T2 remain off, T3 turns on, T4 turns off and T5 turns on. Capacitors C4 and C6 are charged in preparation for the next shift cycle.

The remaining entries are similar and summarized in the table. After the last shift T10, T8, T4 and T2 are on and T6 is off indicating the 11011 entry. The 1 stored in T10 indicates that the entry is complete since T10 turns on the for the first time with the last shift. The solid and dashed staircase lines are used to show the progression of each entry during each of the cycles and should be helpful in following the described entry operation.

While the invention has been particularly shown and described with reference to preferred embodiments thereof, it will be understood by those skilled in the art that various changes in form and details may be made therein without departing from the spirit and scope of the invention.

What is claimed is:

1. A communications terminal for communicating over a two-conductor transmission medium in response to successive polarity changes of the two-conductor medium and comprising:

a plurality of switching stages each including, a switching element having a first state in which the switch is off and passes no current and a second state in which the switch is on and passes current in one direction only, and a control means for controlling said switching element, first means connecting said switching stages including the switching elements in parallel with each other between the two conductors of the transmission medium, said switching elements being arranged so that at least half are connected to pass current in one direction and the remainder are connected to pass current in the opposite direction, second means associated with each stage for exclusively connecting the control means of all but one switching stage to one of the other oppositely connected stages, each said control means responding to conduction in the connected other stage for turning the controlled stage on when the polarity of the transmission medium and the switch element of the controlled stage correspond, and selectively operable means connected to said one switching stage for turning said one stage on when the polarity of the transmission medium and the switch element of the said one stage correspond.

2. A communications terminal as set forth in claim 1 in which said switching elements each include a silicon controlled switch having an anode element, a cathode element and at least one control element whereby the silicon controlled switch assumes a low-impedance state when the elements are properly biased.

3. A communications terminal as set forth in claim 1 in which said control means includes capacitor means including a charging circuit connected to the said other stage via the said second means for charging the said capacitor means via the switching element of the said other stage when the said other stage is in its on state, and means connecting the capacitor means to the associated control element of the silicon controlled switch for turning said switch on when the polarities of the medium and the switch correspond and the capacitor means are charged.

4. A communications terminal as set forth in claim 3 in which the selectively operable means connected to the said one switching stage includes a voltage polarity and magnitude sensitive means responsive to the voltage polarity and magnitude of the two-conductor medium for supplying bias voltage to the control element of the silicon controlled switch for turning said switch on when the magnitude and polarity of the medium attain a predetermined state.

5. A communications terminal as set forth in claim 4 for operation as a transmitter in response to successive polarity changes of equal voltage magnitude on the two-conductor medium and in which each of said stages includes an impedance means in series with the switching element, some of said impedance means being selectively setable to more than one impedance value whereby the impedance between the two conductors of the medium is determined by the impedance selected or provided for a turned-on stage.

6. A communications terminal as set forth in claim 5 in which said selectively setable impedance means may be set to one of two values corresponding to the 1 and 0 values of the binary code.

7. A communications terminal as set forth in claim 4 for accepting and storing sequential information supplied over the two-conductor transmission medium and in which two successive polarity changes are utilized to transmit one bit of information with the voltage level of the first polarity orientation of each pair assuming a first level to transmit a one bit in the binary code and a second level to transmit a zero bit in the binary code, each said stage in said terminal including means responsive to the conductive condition of the silicon controlled switch associated with the stage for providing indicia of the conductive state of the stage.

PO-1050
(5/69)

UNITED STATES PATENT OFFICE
CERTIFICATE OF CORRECTION

Patent No. 3,614,318 Dated October 19, 1971

Inventor(s) Ulrich Klose

It is certified that error appears in the above-identified patent and that said Letters Patent are hereby corrected as shown below:

Claim 3, Column 6, line 69, change the number "1" to number --2--.

Signed and sealed this 28th day of March 1972.

(SEAL)
Attest:

EDWARD M.FLETCHER,JR.
Attesting Officer

ROBERT GOTTSCHALK
Commissioner of Patents